Oct. 1, 1963   M. S. HANKE   3,105,709
MECHANICAL INTERLOCK UNION
Filed May 2, 1961

INVENTOR.
Merlin S. Hanke
BY
Watts Edgerton Pyle & Fisher
ATTORNEYS.

United States Patent Office 3,105,709
Patented Oct. 1, 1963

3,105,709
MECHANICAL INTERLOCK UNION
Merlin S. Hanke, 501 Vineland Road,
Bay Village 40, Ohio
Filed May 2, 1961, Ser. No. 107,119
9 Claims. (Cl. 287—20)

This invention relates to pulley wheel assemblies and more particularly to the construction and manufacture of pulley wheels and hubs.

This invention is particularly applicable to the manufacture of stamped composite pulley wheels which are to be mounted on rotatable shafts. One of the major considerations in composite pulley construction is the prevention of slippage between the hub of the pulley and the outer flanged parts. This slippage is particularly a problem where a pulley is subject to sudden starts and stops under loads which produce high stress.

The pulley of this invention and manufacture thereof has virtually eliminated this problem at a cost which makes the device inexpensive to manufacture and therefore commercially competitive. No elaborate machinery is necessary to produce the device, and a strong non-slipping pulley assembly results. The construction of this pulley makes it very simple to assemble, yet gives it the desired characteristics of non-slippage on the hub member.

Therefore, one of the principal objects of this invention is to provide a pulley wheel with a hub firmly attached thereto.

A more particular object of this invention is to provide a pulley wheel which has an outer portion non-rotatably mounted on a hub by means of mechanical interlocking therebetween.

Other objects and a fuller understanding of the invention may be had by referring to the following description and claims taken in conjunction with the accompanying drawings, in which:

Figure 1:
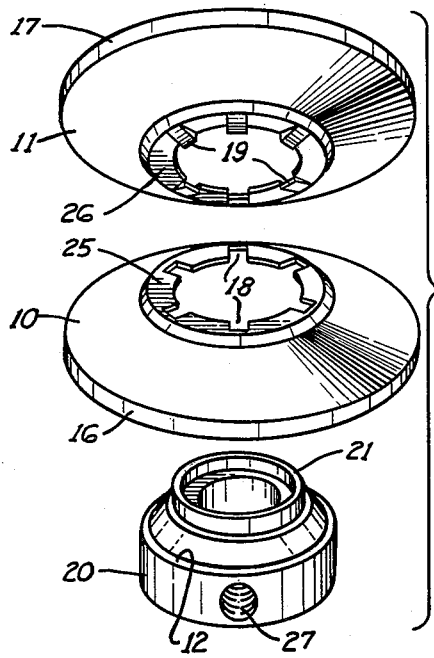
FIGURE 1 is an exploded view of the parts of a preferred embodiment of the invention.
Figure 2:
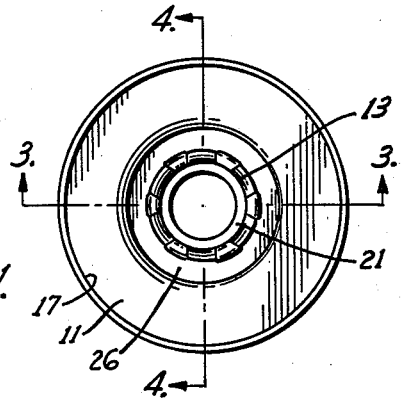
FIGURE 2 is a side view of the assembled pulley.

Referring now to the drawings, two stamped metal discs 10 and 11 are provided having outer rims 16 and 17 and inner rims 25 and 26. The discs are flared toward the outer rims 16 and 17, and have, respectively, central openings defined by the inner rims 25 and 26. The discs are placed in mirror image relationship thus forming a composite annulus. This provides a pulley blank with a "V" groove 24 which is formed to receive a belt.

The only substantial difference between discs 10 and 11 is that a plurality of notches 18 are stamped out of the rim 25, whereas these same areas are only partially stamped from the disc 11 to provide partially severed tabs 19. When the discs 10 and 11 are mated in mirror image relationship the tabs 19 are projecting portions which fit closely into the notches 18 and provide a locking of the two discs against relative rotation.

Having thus achieved the thorough locking of the two discs, it then becomes necessary to lock the assembly of discs to a driving hub.

Figure 4:
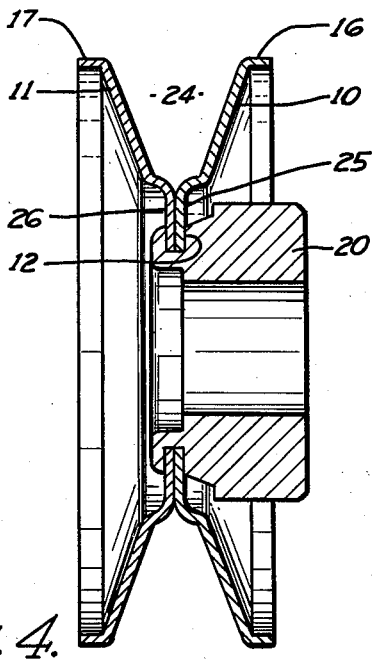
FIGURE 4 is a section, enlarged, taken along the line 4—4 of FIGURE 2.

A hub 20 is provided which, in the disclosed embodiment, has a cylindrical bore to receive a shaft. A threaded opening 27 to accept a set screw is provided in the hub 20 in order that the hub may be mounted on a shaft, thus mounting the whole pulley device. In the illustrated embodiment, the set screw was placed at an angle of about 14° in order to permit the use of a shorter hub, and also to provide a convenient approach angle for the insertion of tightening tool. The hub 20 extends through the central aperture of the mated disc members with one end 21 of the hub 20 extending beyond the central aperture area. End 21 extends from a shoulder 12, which shoulder is an abutment for holding the disc members. This end 21 is of relatively thin section, and is of metal sufficiently soft to be peened and crimped. Therefore, by peening the entire end 21 into a crimped condition, the two disc members 10 and 11 are clamped and held permanently joined as a unit structure. This condition is illustrated best in FIGURE 4 of the drawings. However, holding the discs clinched together will not necessarily prevent their relative rotation or rotation as a unit with respect to the hub, and will not prevent loosening and eventual deterioration of the assembly.

Accordingly, individual spot areas 13 are further crimped and deformed to force metal down into the spaces remaining where the tabs 19 were cut. Thus, by deflecting the tabs 19 and extending these tabs 19 into the notches 18 there is a unit assembly of the two discs provided which cannot rotate with respect to one another. Then, by crimping the end 21 to clamp this assembly against separation, and further causing a local offset of the end 21 to extend into the spaces defined by radially extending rim walls which are on each side of a place where a tab was removed, a completely non-rotative structure with respect to the various parts thereof is obtained.

Figure 3:
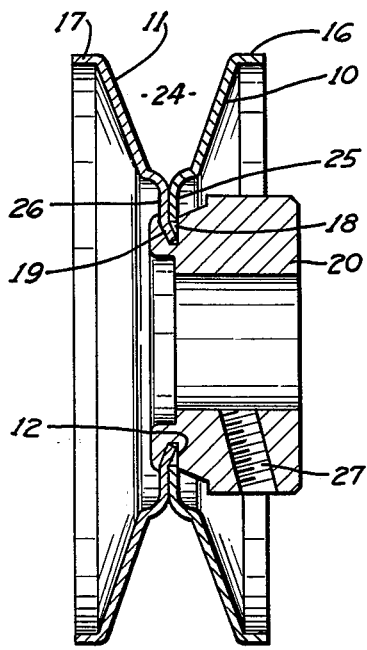
FIGURE 3 is a section, enlarged, taken along line 3—3 of FIGURE 2.

In order to fully appreciate the invention and its structure, the drawing must be studied carefully. The drawing illustrates the structure and arrangement of parts as described, but no one view of the drawing illustrates this new and novel arrangement as clearly as visual observation of the actual product would do. The two cross sections, FIGURES 3 and 4 bring out the fact that parts of the hub merely clinch the two flanges, whereas the spot peened areas of the hub in the vicinity of the notches 18 and tabs 19 are deflected into the notches to lock the assembly together.

The method of manufacture of this pulley wheel is relatively simple. Two annular discs 10 and 11 are provided. The outer rims are flared and the aperture is formed with the notches or tabs as described, according to which half of the assembly is to be provided. The two discs are then placed together in mirror image relationship.

The hub 20 is then inserted through the central opening with the extension 21 extending therethrough. This end is then peened and preferably is peened with a die which has projections corresponding to the areas to be indented into the recesses left by tabs 19.

Although it is entirely possible to assemble and locate the assembled pulley into a press, having a suitable peening die, without any type of indicia to properly locate the pieces, it is far more practical to have a positive means for location. Accordingly, the discs 10 and 11 are marked by permanent marking with the die which is used to stamp the flared form. Whenever the two discs are then placed back-to-back these marks provide a mark which may be used to align the assembled structure in a press having the die with the proper indentation projections for producing the peen indentation into the tab 19. Thus, accurate and positive placement of the assembly in a peening die is assured. This mark is not illustrated in the drawing.

Although the invention has been described in its preferred form with a certain degree of particularity, it is understood that the present disclosure of the preferred form has been made only by way of example and that numerous changes in the details of construction and the

What is claimed is:

1. In a wheel assembly the improvement in a mechanical interlock union holding said assembly united, and the parts thereof non-rotative with respect to one another, comprising, first and second mated annular disc members each having a central opening, the central openings being aligned, the rim of the first disc central opening having at least one notch, the rim of the second disc central opening having a number of tabs partially cut from the disc corresponding to the number of said notches, each said tab being sized and located and fitted closely one into each said notch with said discs mated and said openings aligned, a hub axially aligned with said aligned openings and having a shoulder abutting the rim of said first disc, said hub having a projection portion extending from said shoulder through said aligned openings, the end of said projection being crimped to provide a clamp action to hold the rim areas of said discs clamped against separation, and a spot area of said projection further crimped in the location of each said mated tab and notch with the metal displaced by said crimped spot area moved into the notch area from which the tab area was cut and deflected.

2. In a wheel assembly the improvement in a mechanical interlock union holding said assembly united and the parts thereof non-rotative with respect to one another, comprising:
   (a) first and second mated annular disc members each having a central opening and a rim adjacent the opening, the central openings being aligned;
   (b) said disc members having mutually interlocking portions preventing said disc members from relative rotation;
   (c) a hub axially aligned with the said aligned openings and having a shoulder abutting the rim of said first disc;
   (d) said hub having a projection portion extending from said shoulder through said aligned openings, the end of said projection being generally crimped to provide a clamp action to hold the rims of said discs clamped against separation; and,
   (e) the rims of both disc members including radially disposed walls defining interlocking space with portions of said hub projection extending into the locking space and engaging each of the radially disposed walls to interlock the disc members against rotation relative to the hub.

3. A wheel structure comprising:
   (a) a pair of apertured annular members mated to form a wheel body;
   (b) said members including a plurality of interlocking tabs and notches and a space adjacent each tab;
   (c) a tubular hub extending through the member apertures;
   (d) said hub including radially extending portions overlying portions of the members and maintaining the members clamped together; and,
   (e) one of the hub portions including a part projecting into each space to lock the members against rotation relative to the hub.

4. The device of claim 3 wherein the notches are all in the one member and the tabs are on the other member.

5. A wheel structure comprising:
   (a) a pair of apertured annular members mated to form a wheel body;
   (b) at least one of said members including notched portions and the other of said members including tab portions projecting into said notch portions and locking said members against relative rotation;
   (c) said other member including walls adjacent each of said tab portions defining recesses; and,
   (d) hub means maintaining the apertured members in a clamped together relation and including a portion projecting into the recess defined, said hub retaining said tab portions in said notch portions and coacting with said walls to prevent relative rotation of said hub means and said members.

6. A wheel structure comprising:
   (a) first and second apertured annular members having adjacent annular portions;
   (b) the annular portion of said first apertured member including a notch portion;
   (c) the annular portion of said second apertured member including a tab portion projecting into said notch portion, said second member including walls adjacent said tab portion defining a recess in the second member annular portion where projecting into said notch portion;
   (d) a tubular hub extending through the member apertures, said hub including radially extending portions overlying sections of the apertured members and maintaining the members clamped together; and,
   (e) one of the hub portions including a part projecting into the recess to retain the tab portion in said notch portion and coacting with said walls to lock said apertured members against rotation relative to the hub.

7. The device of claim 6 wherein the annular portions are in abutment with one another.

8. The device of claim 6 wherein the first member has a plurality of notches and the second member has a plurality of tabs and adjacent recesses and wherein a hub portion projects into each such recess.

9. A wheel structure comprising:
   (a) first and second annular members having abutting annular portions, said abutting portions having a center aperture;
   (b) sections of said abutting portions adjacent said center aperture forming notches and tabs wherein each of said tabs projects into one of said notches to lock the apertured members against relative rotation;
   (c) said portions having walls adjacent each of said tabs defining recesses;
   (d) a hub including radially extending portions overlying parts of said members and maintaining the members clamped together; and,
   (e) at least one of the hub portions including crimped portions projecting into said recesses to retain said tabs in said notches and coacting with said walls to prevent relative rotation of said hub and said members.

References Cited in the file of this patent

UNITED STATES PATENTS

| | | |
|---|---|---|
| 785,257 | Gardner | Mar. 21, 1905 |
| 788,185 | Bowen | Apr. 25, 1905 |
| 873,408 | Brinley et al. | Dec. 10, 1907 |
| 1,266,579 | Garcelon | May 21, 1918 |